(12) United States Patent
Zeng et al.

(10) Patent No.: US 12,051,445 B1
(45) Date of Patent: Jul. 30, 2024

(54) METHOD AND APPARATUS OF VIDEO EDITING, AND ELECTRONIC DEVICE AND STORAGE MEDIUM

(71) Applicant: Beijing Zitiao Network Technology Co., Ltd., Beijing (CN)

(72) Inventors: Xiangrui Zeng, Beijing (CN); Jiayu Ji, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/542,524

(22) Filed: Dec. 15, 2023

Related U.S. Application Data

(63) Continuation of application No. PCT/CN2023/138239, filed on Dec. 12, 2023.

(30) Foreign Application Priority Data

Jan. 19, 2023 (CN) .......................... 202310107566.3

(51) Int. Cl.
  *G11B 27/031* (2006.01)
  *G10L 15/00* (2013.01)
(52) U.S. Cl.
  CPC ............ *G11B 27/031* (2013.01); *G10L 15/00* (2013.01)
(58) Field of Classification Search
  USPC ....................................................... 386/278
  See application file for complete search history.

(56) References Cited

U.S. PATENT DOCUMENTS

| | | | | |
|---|---|---|---|---|
| 2011/0276396 A1* | 11/2011 | Rathod | .............. | G06Q 30/0282 707/706 |
| 2011/0317984 A1* | 12/2011 | Masutani | ......... | H04N 21/44008 386/285 |
| 2011/0320198 A1* | 12/2011 | Threewits | ............... | G10L 13/00 704/235 |
| 2012/0323897 A1 | 12/2012 | Daher et al. | | |

FOREIGN PATENT DOCUMENTS

| | | |
|---|---|---|
| CN | 109040773 A | 12/2018 |
| CN | 113613068 A | 11/2021 |
| CN | 114999530 A | 9/2022 |
| CN | 115623279 A | 1/2023 |

* cited by examiner

*Primary Examiner* — Nigar Chowdhury
(74) *Attorney, Agent, or Firm* — BakerHostetler

(57) ABSTRACT

Embodiments of the present disclosure provide a method and apparatus of video editing, an electronic device and a storage medium. The method comprises: determining an ineffective text in a speech text of a target video and a timeline position of the ineffective text by performing speech recognition on an audio in the target video; presenting an editing track segment of the target video on an editing interface of the target video, and identifying a timeline interval of the ineffective text on the editing track segment based on the timeline position of the ineffective text; in response to an adjustment operation on the ineffective text, adjusting the timeline interval of the ineffective text on the editing track segment of the target video; in response to a video segment deleting operation on the ineffective text, deleting a video segment of the editing track segment within the timeline interval of the ineffective text from the target video.

20 Claims, 8 Drawing Sheets

METHOD AND APPARATUS OF VIDEO EDITING, AND ELECTRONIC DEVICE AND STORAGE MEDIUM

This application is a continuation of International Patent Application No. PCT/CN2023/138239, filed on Dec. 12, 2023, which claims priority to Chinese Application No. 202310107566.3, entitled "a method and apparatus of video editing, and an electronic device and a storage medium" and filed on Jan. 19, 2023, both of which are incorporated herein by reference in their entireties.

FIELD

Embodiments of the present disclosure relate to the technical field of computers, and in particular, to a method and apparatus of video editing, and an electronic device and a storage medium.

BACKGROUND

With the rapid development of science and technology, video class applications have emerged, for example, users may capture and upload oral broadcast videos to video class applications, and on-camera oral broadcast or audio carries the core content of the oral broadcast video. Therefore, how to better edit the oral broadcast video is a current pressing issue.

Editing the oral broadcast video mainly involves removing pauses, stutters, verbiage, and other segments of the video that users do not need. Existing editing methods generally identify ineffective segments by the audio waveform in the video, but such methods consume a long time and the editing efficiency is low.

SUMMARY

Embodiments of the present disclosure provide a method and apparatus of video editing, and an electronic device and a storage medium, so as to improve the video editing efficiency.

In a first aspect, an embodiment of the present disclosure provides a method of video editing, comprising: determining an ineffective text in a speech text of a target video and a timeline position of the ineffective text by performing speech recognition on an audio in the target video, the timeline position of the ineffective text representing a time when a speech audio of the ineffective text appears in the target video; presenting an editing track segment of the target video on an editing interface of the target video, and identifying a timeline interval of the ineffective text on the editing track segment based on the timeline position of the ineffective text, the timeline interval of the ineffective text being a time interval when the speech audio of the ineffective text appears in the target video; in response to an adjustment operation on the ineffective text, adjusting the timeline interval of the ineffective text on the editing track segment of the target video; and in response to a video segment deleting operation on the ineffective text, deleting a video segment of the editing track segment within the timeline interval of the ineffective text from the target video.

In a second aspect, an embodiment of the present disclosure further provides an apparatus of video editing, comprising: a text determining module, configured to determine an ineffective text in a speech text of a target video and a timeline position of the ineffective text by performing speech recognition on an audio in the target video, the timeline position of the ineffective text presenting a time when a speech audio of the ineffective text appears in the target video; an interval identifying module, configured to present an editing track segment of the target video on an editing interface of the target video, and identify a timeline interval of the ineffective text on the editing track segment based on the timeline position of the ineffective text, the timeline interval of the ineffective text being a time interval when the speech audio of the ineffective text appears in the target video; an interval adjustment module, configured to, in response to an adjustment operation on the ineffective text, adjust the timeline interval of the ineffective text on the editing track segment of the target video; and a segment deleting module, configured to, in response to a video segment deleting operation on the ineffective text, delete a video segment of the editing track segment within the timeline interval of the ineffective text from the target video.

In a third aspect, an embodiment of the present disclosure provides an electronic device, comprising: at least one processor; and a memory, communicatively connected with the at least one processor; where the memory stores a computer program executable by the at least one processor, the computer program, when executed by the at least one processor, causes the at least one processors to perform the method of video editing as described in the embodiments of the present disclosure.

In a fourth aspect, an embodiment of the present disclosure provides a computer readable storage medium, storing computer instructions thereon, the computer instructions causing a processor to perform the method of video editing as described in the embodiments of the present disclosure.

The embodiments of the present disclosure provide a method and apparatus of video editing, an electronic device and a storage medium. The method comprises: determining an ineffective text in a speech text of the target video and a timeline position of the ineffective text by performing speech recognition on an audio in a target video, the timeline position of the ineffective text representing a time when a speech audio of the ineffective text appears in the target video; presenting an editing track segment of the target video on an editing interface of the target video, and identifying a timeline interval of the ineffective text on the editing track segment based on the timeline position of the ineffective text, the timeline interval of the ineffective text being a time interval when the speech audio of the ineffective text appears in the target video; in response to an adjustment operation on the ineffective text, adjusting the timeline interval of the ineffective text on the editing track segment of the target video; and in response to a video segment deleting operation on the ineffective text, deleting a video segment of the editing track segment within the timeline interval of the ineffective text from the target video. With the above technical solution, by performing speech recognition on the audio in the target video, the ineffective text in the target video and the position of the ineffective text can be determined; further, by identifying the timeline interval of the ineffective text on the editing track segment of the target video, the ineffective segment can be deleted in response to the user performing adjustment operation and video segment deleting operation on the ineffective text, thereby completing the video editing and improving the efficiency of video editing.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn scale.

DETAILED DESCRIPTION OF EMBODIMENTS

Embodiments of the present disclosure will be described in more detail with reference to the accompanying drawings, in which some embodiments of the present disclosure have been illustrated. However, it should be understood that the present disclosure can be implemented in various ways, and thus should not be construed to be limited to embodiments disclosed herein. On the contrary, these embodiments are provided for the thorough and complete understanding of the present disclosure. It should be understood that the drawings and embodiments of the present disclosure are merely for the illustration propose and not limiting the protection scope of the present disclosure.

It should be understood that various steps described in method embodiments of the present disclosure may be performed in a different order and/or in parallel. In addition, the method embodiments may comprise an additional step and/or omit a step which is shown. The scope of the present disclosure is not limited in this regard.

The term "comprise" and its variants used here are to be read as open terms that mean "include, but is not limited to." The term "based on" is to be read as "based at least in part on." The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

Names of messages or information interacted between multiple apparatuses in the implementation of the present disclosure are merely for the illustration purpose, rather than limiting the scope of these messages or information.

Figure 1:
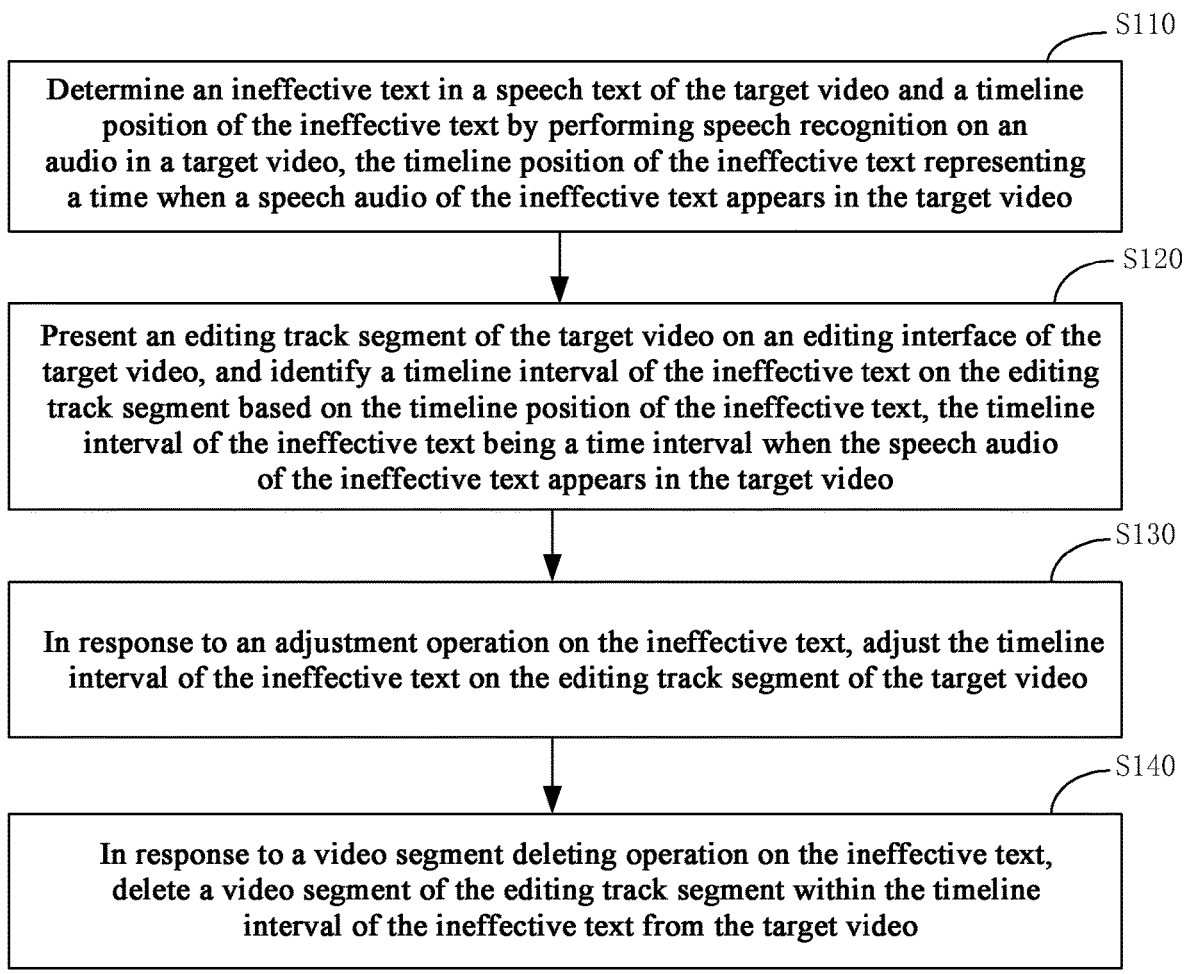
FIG. 1 is a schematic flowchart of a method of video editing provided by an embodiment of the present disclosure.

FIG. 1 is a schematic flowchart of a method of video editing provided by an embodiment of the present disclosure. The method may be performed by an apparatus of video editing, where the apparatus may be implemented as software and/or hardware and usually integrated in an electronic device. The electronic device in this embodiment includes but is not limited to: a mobile phone, a computer or other device.

As shown in FIG. 1, the method of video editing provided by the embodiment of the present disclosure comprises the following:

S110: an ineffective text in a speech text of the target video and a timeline position of the ineffective text is determined by performing speech recognition on an audio in a target video, the timeline position of the ineffective text representing a time when a speech audio of the ineffective text appears in the target video;

The target video may refer to a video that needs to be edited, for example, the target video may be a video uploaded or captured online by a user. In this embodiment, the target video contains audio, and the speech text may be regarded as textual information corresponding to the audio in the target video, which may be obtained through performing speech recognition on the audio in the target video. As an example, the speech text comprises an ineffective text, and the ineffective text may comprise pauses, stutters, verbiage, and other text in the target video corresponding to segments that users do not need; and the timeline position of the ineffective text may be used to represent the time when the speech audio of the ineffective text appears in the target video.

In one embodiment, the target video is a continuous video. For example, the target video may be a certain continuous and complete video or a given segment of a complete video.

In this embodiment, by performing speech recognition on the audio in the target video, the ineffective text in the speech text of the target video and the timeline position of the ineffective text are determined in order to perform an editing step subsequently. The present step is not intended to limit a specific mode of the speech recognition and the timing of triggering the speech recognition. For example, the speech recognition of the audio in the target video may be triggered by triggering a certain recognition control in an interface, so that the ineffective text in the target video and the timeline position of the ineffective text may be automatically recognized. The position and style of the recognition control are not limited, which may be set according to the actual page situation.

In one implementation, a recognition condition for the ineffective text is as follows: a segment having a mute duration longer that a preset duration (e.g., 120 ms, etc.) is regarded as a pause segment by default; and ineffective words (e.g., repetition and intonation) are recognized by reusing the logic of a preset algorithm, and the preset algorithm may be configured either in the current application or in the server.

Figure 2:
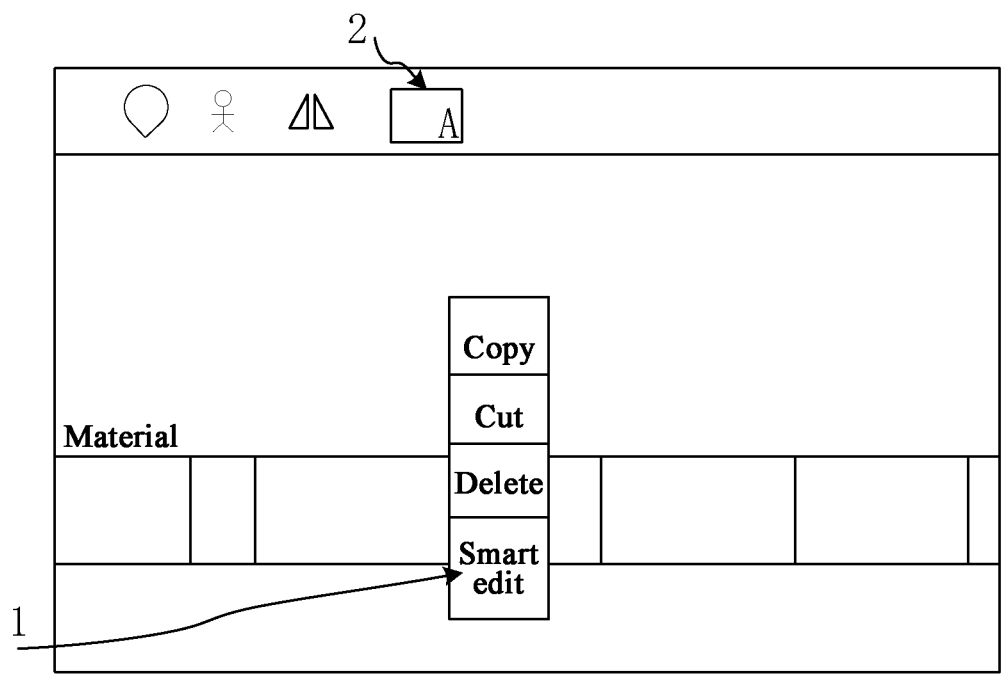
FIG. 2 is a schematic view of triggering speech recognition provided by an embodiment of the present disclosure.

FIG. 2 is a schematic view of triggering speech recognition provided by an embodiment of the present disclosure. As depicted, after selecting a given video (e.g., target video), a control 1 in the right-click popup window may be triggered, thereby triggering the speech recognition on the audio in the target video. Further a shortcut control 2 on the current interface may be clicked on to realize the speech recognition on the audio in the target video.

S120: an editing track segment of the target video on an editing interface of the target video is presented, and a timeline interval of the ineffective text on the editing track segment is identified based on the timeline position of the ineffective text, the timeline interval of the ineffective text being a time interval when the speech audio of the ineffective text appears in the target video;

The editing interface may be used to edit segments in the target video. The editing track segment of the target video may be construed as an editing track segment corresponding to the target video, for example, an editing track segment whose a start point corresponds to the start point of the target video and whose an end point corresponds to the end point of the target video. As an example, when the target video is a continuous and complete video, the editing track segment may be an editing track of the continuous and complete video; when the target video is a segment of a certain complete video, the editing track segment may be a track segment that corresponds to the target video, in the editing track of the complete video. Optionally, the editing track segment is an audio track segment of the target video, and the audio track segment may refer to an audio track segment corresponding to the target video. The timeline interval of the ineffective text may be regarded as a time interval when the speech audio of the ineffective text appears in the target video.

In one embodiment, after an ineffective text of a target video and a timeline position of the ineffective text are determined by performing speech recognition on the audio in the target video, an editing track segment may be presented on the editing interface of the target video, and a timeline interval of the ineffective text may be identified on the editing track segment. The way of presenting the editing track segment and identifying the ineffective text is not limited here, but may be set by relevant personnel according to the actual situation of the editing interface. For example, the timeline interval of the ineffective text may be identified on the editing track segment of the target video by using a preset identification, and the preset identification may be set according to specific needs. As an example, the preset identification may be a rectangular box, and then the timeline interval of the ineffective text in the target video may be box-selected on the editing track segment of the target video by using a rectangular box; or the timeline interval of the ineffective text may be identified as a first presentation style in the editing track segment, while a timeline interval of other text may be identified as a second presentation style in the editing track segment, and the first presentation style is different from the second presentation style. For example, the first presentation style and the second presentation style may be distinguished by different colors or by different lines, etc.

In one implementation, timeline intervals of all ineffective text obtained by recognition may be identified on the editing track segment by default, so as to distinguish timeline intervals between ineffective text and other text. Alternatively, timeline intervals of a preset number of ineffective texts may be identified on the editing track segment by default, and the preset number may be set in advance by relevant persons. The user may adjust the timeline interval of the ineffective text according to needs.

Figure 3:
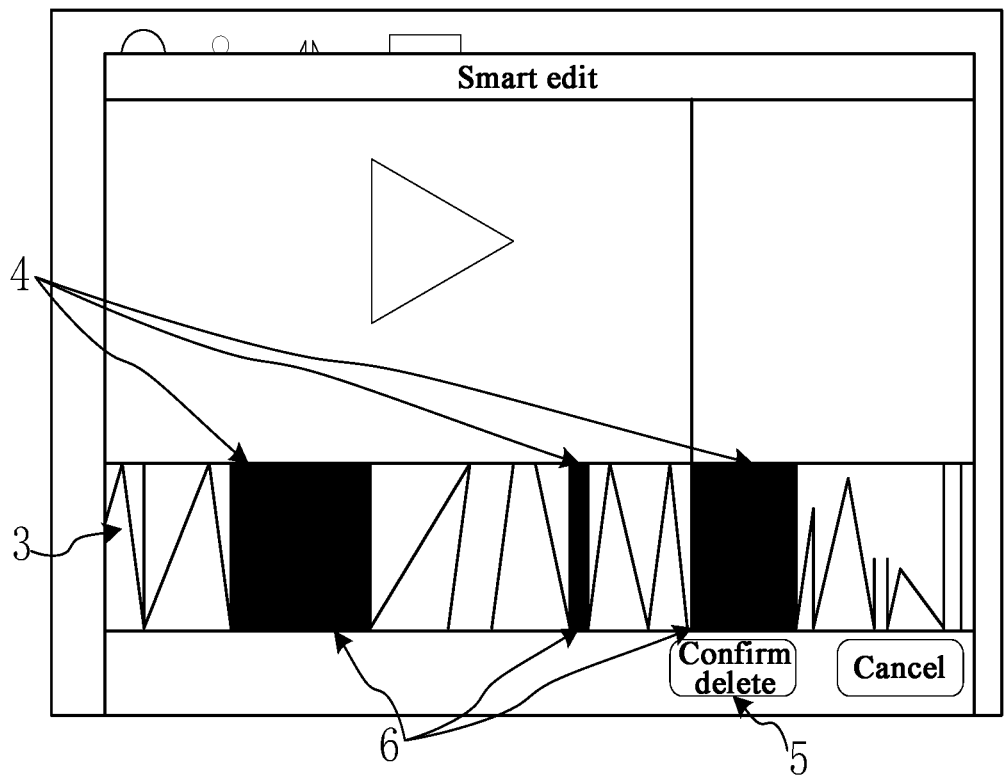
FIG. 3 is a schematic view of an editing interface provided by an embodiment of the present disclosure.

FIG. 3 is a schematic view of an editing interface provided by an embodiment of the present disclosure. As depicted, an editing track segment 3 of the target video may be presented on an editing interface of the target video, and the timeline interval of the ineffective text is identified on the editing track segment 3 based on the timeline position of the ineffective text as recognized in the previous step, for example, a timeline interval 4 of the ineffective text is identified by using a black rectangular box in FIG. 3.

S130: in response to an adjustment operation on the ineffective text, the timeline interval of the ineffective text is adjusted on the editing track segment of the target video.

The adjustment operation on the ineffective text may refer to an operation for triggering the adjustment to the timeline interval of the ineffective text. This embodiment is not intended to limit a specific operation mode of the adjustment operation on the ineffective text. For example, the adjustment operation on the ineffective text may be an operation of clicking on a certain control in the editing interface, a preset triggering operation on the editing track segment, or an operation of preset gestures in the editing interface, where preset gestures may be gestures set in advance, e.g., the preset gesture may be a gesture swiping right, etc.

This embodiment is not intended to limit the triggering position for the adjustment operation, for example, the adjustment operation may be acted on the timeline interval of the ineffective text or other position, so long as the adjustment of the timeline interval of the ineffective text can be triggered.

Specifically, in this embodiment, in response to the adjustment operation on the ineffective text, the timeline interval of the ineffective text is adjusted on the editing track segment of the target video. The specific way of adjusting the timeline interval may be different in light of the adjustment operation. For example, when the adjustment operation on the ineffective text is to trigger a control to change the state of the ineffective text from a selected stated to a non-selected state, the number of timeline intervals of the ineffective texts may be adjusted in the editing track segment of the target video, for example, the timeline interval identifying a certain text is added on the editing track segment in order to adjust the text to be an ineffective text, or the time interval identifying a certain text is canceled on the editing track segment in order to adjust the text to be a non-ineffective text.

S140: in response to a video segment deleting operation on the ineffective text, a video segment of the editing track segment within the timeline interval of the ineffective text is deleted from the target video.

The video segment deleting operation on the ineffective text may refer to an operation for triggering the deletion of a video segment on the editing track segment corresponding to the ineffective text, for example, the video segment deleting operation of the ineffective text may be an operation of clicking on a certain deleting control in the editing interface.

In this step, in response to the video segment deleting operation on the ineffective text, the video segment within the timeline interval of the ineffective text on the editing track segment is deleted from the target video. The specific deletion mode is not limited here, e.g., retaining or removing traces corresponding to timeline intervals of ineffective text on edited track segments according to user needs. As shown in FIG. 3, the user triggering a control 5 may be regarded as a video segment deleting operation, and after the user triggers the control 5, the electronic device may, in response to the video segment deleting operation on the ineffective text, delete a video segment corresponding to a timeline interval 6 of the ineffective text from the target video.

In one embodiment, deleting the video segment of the editing track segment within the timeline interval of the ineffective text from the target video comprises: deleting the video segment of the editing track segment within the timeline interval of the ineffective text from the target video, and splitting the target video into a plurality of separate video segments by using the deleted video segment as a split point; or deleting the video segment of the editing track segment within the timeline interval of the ineffective text from the target video, and integrating the target video after the video segment has been deleted into a single video.

In one implementation, the video segment of the editing track segment within the timeline interval of the ineffective text may be deleted from the target video, and the target video is split into multiple separate video segments by using the deleted video segment as a split point. On this basis, the user can conveniently perform operations on the various separate video segments according to needs.

In one implementation, the video segment of the editing track segment within the timeline interval of the ineffective text may be deleted from the target video, and the target video after the video segment has been deleted may be integrated into a single video. On this basis, ineffective segments in the target video are deleted, which improves the quality of the target video. The ineffective segment is a segment corresponding to the timeline interval of the ineffective text, in other words, a text in the speech text of the target video corresponding to the timeline interface identified on the editing track segment.

With the method of video editing provided by the embodiments of the present disclosure, an ineffective text in speech text of the target video and a timeline position of the ineffective text are determined by performing speech recognition on an audio in a target video, the timeline position of the ineffective text representing a time when a speech audio of the ineffective text appears in the target video; an editing track segment of the target video is presented on an editing interface of the target video, and a timeline interval of the ineffective text is identified on the editing track segment based on the timeline position of the ineffective text, the timeline interval of the ineffective text being a time interval when the speech audio of the ineffective text appears in the target video; in response to an adjustment operation on the ineffective text, the timeline interval of the ineffective text is adjusted on the editing track segment of the target video; and in response to a video segment deleting operation on the ineffective text, a video segment of the editing track segment within the timeline interval of the ineffective text is deleted from the target video. With the method, by performing speech recognition on the audio in the target video, the ineffective text in the target video and the position of the ineffective text can be determined, further the timeline interval of the ineffective text on the editing track segment of the target video can be identified and the ineffective segment can be deleted in response to an adjustment operation and a video segment deleting operation from the user on the ineffective text, thereby completing the video editing and increasing the efficiency of video editing.

In one embodiment, the method further comprises: playing the target video in a video area of the editing interface; and in response to playing the target video to a start position of a second timeline interval, adjusting a playing progress of the target video to a first time point and continuing to play the target video from the first time point, where the second timeline interval is a timeline interval of the ineffective text, and the first time point is a time point in the target video corresponding to an end position of the second timeline interval.

The video area may be regarded as a certain area in the editing interface for playing the target video, and the specific position and size of the video area may be set by relevant personnel according to the situation of the editing interface. The second timeline interval may be a timeline interval of any ineffective text, and the first time point may be construed as a time point in the target video corresponding to an end position of the second timeline interval.

In one implementation, the target video may be played in the video area of the editing interface, and the timing of playing the target video is not limited, e.g., the target video may be automatically played when the editing interface is displayed; or the target video may be played in the video area of the editing interface when the user triggers a certain play control in the editing interface after the editing interface is displayed; and further the target video may be automatically played after the editing interface is displayed for a preset duration. This embodiment is not intended to limit in this regard.

When the target video is played to the start position of the second timeline interval, this embodiment may automatically adjust the playing progress of the target video to the first time point and continue to play the target video from the first time point. On this basis, by automatically skipping ineffective segments when playing the target video, the user can preview the edited video so as to better edit the target video.

In one embodiment, after playing the target video in the video area of the editing interface, the method further comprises: in response to a triggering operation on a fifth text, adjusting the playing progress of the target video to a second time point and continuing to play the target video from the second time point, the fifth text being displayed within a text area of the editing interface, the fifth text being an ineffective text or a non-ineffective text, and the second time point being a time point in the target video corresponding to a start position of the fifth text.

In this embodiment, the fifth text may be a text triggered by the user, which may be either an ineffective text or a non-ineffective text. The non-ineffective text is a text other than the ineffective text, such as an ineffective text in speech text of the target video. The fifth text may be displayed in a text area of the target video. The text area may be regarded as a certain area in the editing interface for displaying the speech text of the target video, e.g., for displaying the fifth text in the speech text of the target video. The specific position and size of the text area may be set by relevant personnel according to the situation of the editing interface.

In one implementation, the ineffective text in the text area forms a paragraph separately, e.g., "pause" text may be put on a separate line while the duration of the pause is presented.

The triggering operation on the fifth text may be used to trigger the adjustment of the playing progress of the target video to the second time point, e.g., the triggering operation on the fifth text may be an operation of clicking on the fifth text; the second time point is a time point in the target video corresponding to the start position of the fifth text.

Specifically, after the target video in the video area of the editing interface is played, in response to a triggering operation on the fifth text, the playing progress of the target video may be adjusted to the second time point, and the target video may be continued playing from the second time point. On this basis, by responding to the triggering operation on the fifth text, the adjustment of playing progress of the target video can be realized, so that a corresponding text is located in the target video, making it convenient for the user to view a video segment corresponding to the corresponding text.

In one embodiment, a time identification is further presented on the editing track segment, and after playing the target video in the video area of the editing interface, the method further comprises: in response to a position adjustment operation on the target identification, determining a third timeline interval where a target position of the target identification is located, the target position being a position of the target identification on the editing track segment upon completion of the position adjustment operation; in response to the third timeline interval being a timeline interval of the ineffective text, adjusting the playing progress of the target video to a third time point and continuing to play the target video from the third time point, wherein the third time point is a time point in the target video corresponding to a start position or an end position of the third timeline interval, or is a time point to which the target video is finally played before the position progress adjustment operation is received; and in response to the third timeline interval being not a timeline interval of the ineffective text, adjusting the playing progress of the target video to a fourth time point and continuing to play the target video from the fourth time point, wherein the fourth time point is a time point in the target video corresponding to the target position.

The time identification is used to characterize a time point, to which the target video is currently played, in the editing track segment of the target video. In other words, the time identification may be used to indicate a time point corresponding to the current playing progress of the target video. When the current application plays the target video in the video area of the editing interface, the position of the target identification in the editing track segment of the target video may be updated in real time according to the playing progress of the target video. The position adjustment operation of the target identification may be understood as an operation of adjusting the position of the target identification. For example, the position adjustment operation on the target identification may be an operation of clicking on a certain position a in the editing track segment in order to adjust the target identification to the position a, or the position adjustment operation on the target identification may be an operation of dragging the target identification in order to adjust the target identification to the position a. The target position may be regarded as a position of the target identification on the editing track segment upon completion of the position adjustment operation, and the third timeline interval is a timeline interval where the target position of the target identification is located.

The third time point may be a time point in the target video corresponding to the start position of the third timeline interval, or a time point in the target video corresponding to the end position of the third timeline interval, or a time point to which the target video is finally played before the position progress adjustment operation is received; the fourth time point may be regarded as a time point in the target video corresponding to the target position.

In this step, after playing the target video in the video area of the editing interface, the position of the target identification may further be adjusted in response to the position adjustment operation on the target identification.

As an example, during performing the position adjustment operation on the target identification, the playing progress of the target video may be adjusted based on the position of the time identification in the editing track segment. When the position adjustment operation is completed, the target position of the target identification is determined, the third timeline interval where the target position is located is determined, and the playing progress of the target video is adjusted differently depending on the third timeline interval respectively.

In one implementation, when the third timeline interval is a timeline interval of ineffective text, the playing progress of the target video may be adjusted to the fourth time point, and the target video is continued to be played from the fourth time point. As an example, when the target identification is dragged into a timeline interval A of certain ineffective text, this embodiment automatically adjusts the playing progress of the target video to an end position of the timeline interval A so as to continue to play the target video from the end position of the timeline interval A; or restores the position of the target identification to a position where the target identification is finally located before the position adjustment operation is received and continues to play the target video from this position. When a certain position in the timeline interval A identified on the editing track segment of the target video is clicked on, this embodiment automatically adjusts the playing progress of the target video to a start position of the timeline interval A and continues to play the target video from the start position of the timeline interval A.

In one implementation, when the third timeline interval is not a timeline interval of ineffective text, the playing progress of the target video may be adjusted to a time point in the target video corresponding to the target position, and the target video may be continued to be played from this time point. As an example, when a target position b to which the target identification is dragged is not located within the timeline interval of ineffective text, or the target position b to which the target identification is moved through a manner of clicking is not located within the timeline interval of the ineffective text, this embodiment may adjust the playing progress of the target video to a time point c in the target video corresponding to the target position b and continue to play the target video from the time point c. On this basis, by responding to the position adjustment operation on the target identification, when the adjusted position of the target identification is located in the ineffective segment, a video segment corresponding to the ineffective text can be automatically skipped or the video segment may be completely played from the start position of the video segment corresponding to the ineffective text. When the adjusted position of the target identification is not located in the ineffective segment, the target video may be played from a time point corresponding to the position.

Figure 4:
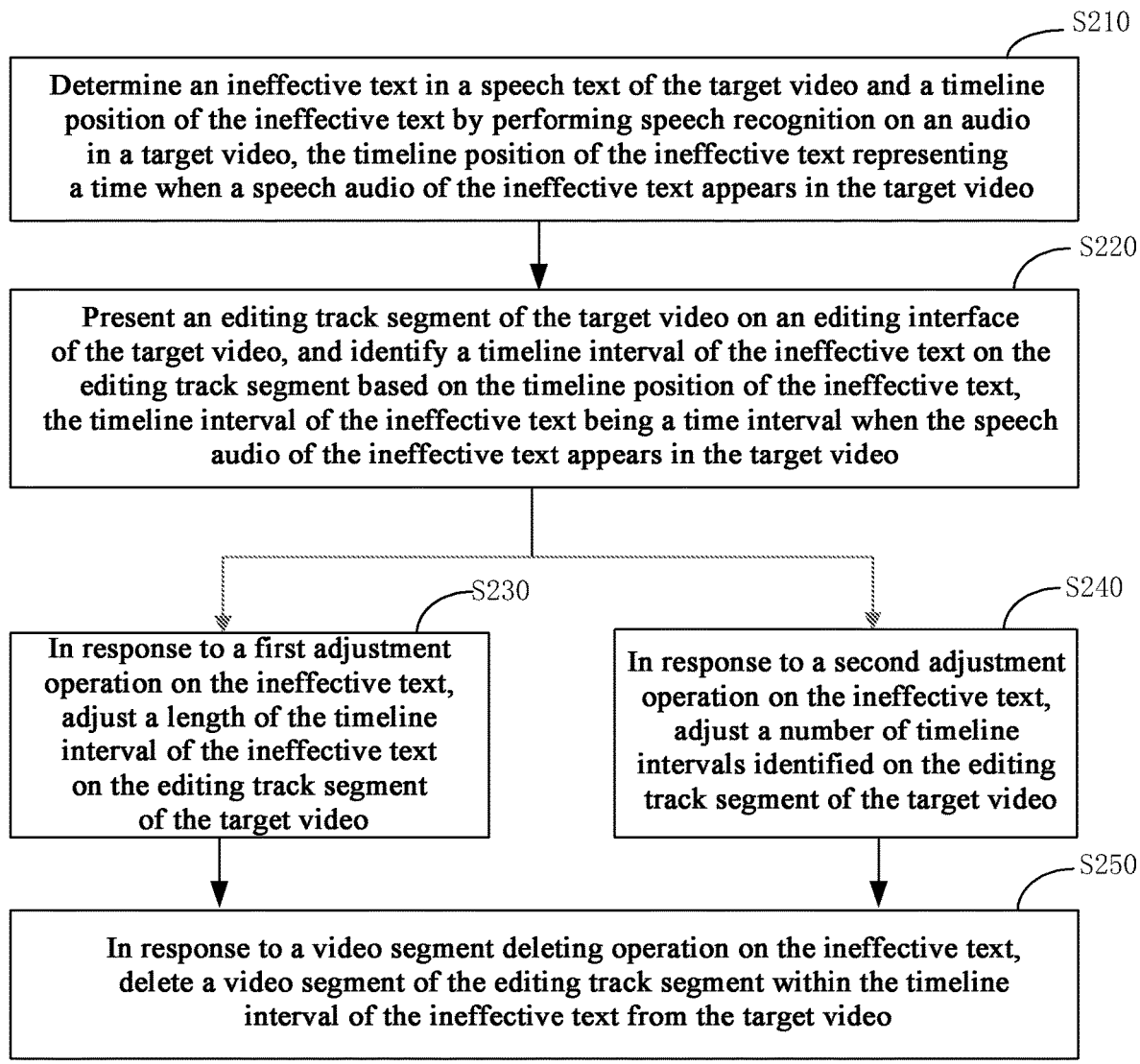
FIG. 4 is a schematic flowchart of a further method of video editing provided by an embodiment of the present disclosure.

FIG. 4 is a schematic flowchart of a further method of video editing provided by an embodiment of the present disclosure. The solution in this embodiment may be combined with one or more optional solutions in the foregoing embodiments. Optionally, in response to an adjustment operation on the ineffective text, adjusting the timeline interval of the ineffective text on the editing track segment of the target video comprises at least one of: in response to a first adjustment operation on the ineffective text, adjusting a length of the timeline interval of the ineffective text on the editing track segment of the target video; and in response to a second adjustment operation on the ineffective text, adjusting a number of timeline intervals identified on the editing track segment of the target video. As shown in FIG. 4, the method comprises the following:

S210: an ineffective text in a speech text of the target video and a timeline position of the ineffective text are determined by performing speech recognition on an audio in a target video, the timeline position of the ineffective text representing a time when a speech audio of the ineffective text appears in the target video.

S220: an editing track segment of the target video is presented on an editing interface of the target video, and a timeline interval of the ineffective text on the editing track segment is identified based on the timeline position of the ineffective text, the timeline interval of the ineffective text being a time interval when the speech audio of the ineffective text appears in the target video.

S230: in response to a first adjustment operation on the ineffective text, a length of the timeline interval of the ineffective text is adjusted on the editing track segment of the target video.

The first adjustment operation may be used to adjust the length of the timeline interval of the ineffective text, and the first adjustment operation may act on the editing track segment of the target video. As an example, the first adjustment operation may be an operation of stretching or compressing a timeline interval B of certain ineffective text on the editing track segment of the target video, such as an operation of dragging a start position of the timeline interval B to the left.

This step may, in response to the first adjustment operation on the ineffective text, adjust the length of the timeline interval of the ineffective text on the editing track segment of the target video. For example, when the left boundary of a certain timeline interval is dragged to the left or the right boundary of a certain timeline interval is dragged to the right, the interval length of the timeline interval may be extended, and when the left boundary of a certain timeline interval is dragged to the right or the right boundary of a certain timeline interval is dragged to the right, the interval length of the timeline interval may be shortened.

S240: in response to a second adjustment operation on the ineffective text, the number of timeline intervals identified on the editing track segment of the target video is adjusted.

The second adjustment operation may act on the number of timeline intervals identified on the editing track segment, e.g., the second adjustment operation may act on a certain adjustment control. Each ineffective text may correspond to one adjustment control, the adjustment control used to control whether to identify a timeline interval corresponding to the ineffective text on the editing track segment; the second adjustment operation may also act on the timeline interval of the editing track segment.

This step may, in response to the second adjustment operation on the ineffective text, adjust the number of timeline intervals identified on the editing track segment of the target video. This embodiment is not intended to limit the specific process of adjustment, so long as the number of timeline intervals identified on the editing track segment can be adjusted.

S250: in response to a video segment deleting operation of the ineffective text, a video segment of the editing track segment within in the timeline interval of the ineffective text is deleted from the target video.

With the method of video editing provided by the embodiment of the present disclosure, by responding to the first adjustment operation and the second adjustment operation on the ineffective text, the length and number of timeline intervals of the ineffective text on the editing track segment of the target video can be adjusted, so that the target video can be precisely edited according to user needs.

In one embodiment, presenting the editing track segment of the target video on the editing interface of the target video comprises: presenting the editing track segment of the target video in a track area of the editing interface and presenting an ineffective text and a non-ineffective text in the speech text in a text area of the editing interface, wherein the ineffective text is presented as a selected state in the editing interface, and the non-ineffective text is presented as a non-selected state in the editing interface.

The track area may be a given area within the editing interface for presenting the editing track segment of the target video. The selected state may be construed as a state in which certain text is selected, so as to characterize that this text will be deleted; the non-selected state may be construed as a state in which certain text is not selected, so as to characterize that this text will not be deleted.

In this embodiment, the specific process of presenting the editing track segment of the target video on the editing interface of the target video may be as follows: presenting the editing track segment of the target segment in the track area of the editing interface, and presenting the ineffective text and the non-ineffective text in the speech text in the text area of the editing interface, where the ineffective text may be presented as a selected state in the editing interface, and the non-ineffective text may be presented as a non-selected state in the editing interface. On this basis, the ineffective text and the non-ineffective text in the speech text may be presented in the text area of the editing interface while the editing track segment is presented. In addition, by presenting the ineffective text in a selected state by default, the user can be prompted to delete the ineffective text, the need for the user to perform the corresponding selection operation to select pauses, repetitions and other ineffective text in order to delete them can be avoided, and operations needed for the user to delete the ineffective text in the target video is further simplified.

Figure 5:
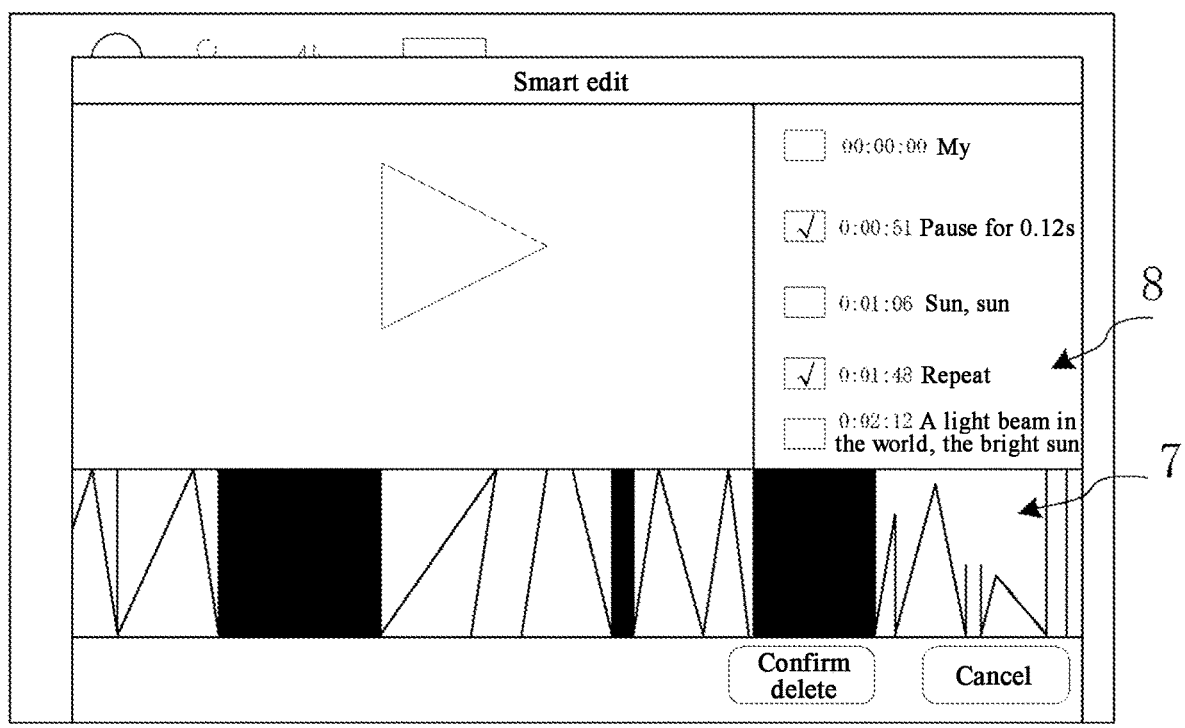
FIG. 5 is a schematic view of a further editing interface provided by an embodiment of the present disclosure.

FIG. 5 is a schematic view of a further editing interface provided by an embodiment of the present disclosure. As depicted, an editing track segment of a target video is presented in a track area 7 of the editing interface, and an ineffective text (e.g., "pause for 0.12 s" or "repeat") and a non-ineffective text (e.g., "my") in a speech text is presented in a text area 8 of the editing interface, where the ineffective text is presented as a selected state in the editing interface, and the non-ineffective text is presented as a non-selected state in the editing interface.

In one embodiment, the adjusting the length of the timeline interval of the ineffective text on the editing track segment of the target video comprises: adjusting the length of a first timeline interval of a first text on the editing track segment of the target video and updating the target text presented in the text area, the target text comprising the first text and/or a second text associated with the first text.

The first text may be ineffective text, such as text belonging to the timeline interval targeted by the first triggering operation. The first timeline interval is the timeline interval of the first text. The target text may refer to a corresponding text to be adjusted. For example, the target text may comprise the first text and/or the second text associated with the first text, and the second text may be a text corresponding to a timeline interval adjacent to a timeline interval of the first text or may be a text corresponding to a new timeline interval shortened from a timeline interval adjacent to a timeline interval of the first text.

Specifically, while the length of the first timeline interval of the first text is adjusted on the editing track segment of the target video, the target text presented in the text area needs to be updated, and the updated content may be determined by the first adjustment operation. On this basis, while the length of the first timeline interval is adjusted, a text corresponding to the adjusted portion in the text area can be updated in real time, so as to precisely adjust the duration corresponding to the timeline interval of the ineffective text.

In one embodiment, the first adjustment operation comprises a length extending operation, and updating the target text presented in the text area comprises: moving text content in the second text corresponding to an extended portion of the first timeline interval to the first text.

The length extending operation may be regarded as an operation of extending the length of the first timeline interval, e.g., the length extending operation may be an operation of dragging the start position of the first timeline interval to the left or dragging the end position of the first timeline interval to the right.

In one implementation, when the length of the first timeline interval of the first text is extended on the editing track segment, the text content in the second text corresponding to the extended portion of the first timeline interval may be synchronously moved to the first text in the text area. As an example, when the first adjustment operation is an operation of dragging the start position of the first timeline interval to the left, the second text is the text corresponding to the timeline interval on the left of the first timeline interval, and then the text content in the second text corresponding to the extended portion of the first timeline interval needs to be moved to the first text.

In one implementation, the length extending operation may support moving part of text in an adjacent non-ineffective text to the first text, and when the second text is an ineffective text, the length extending operation may be or not be supported.

Figure 6:
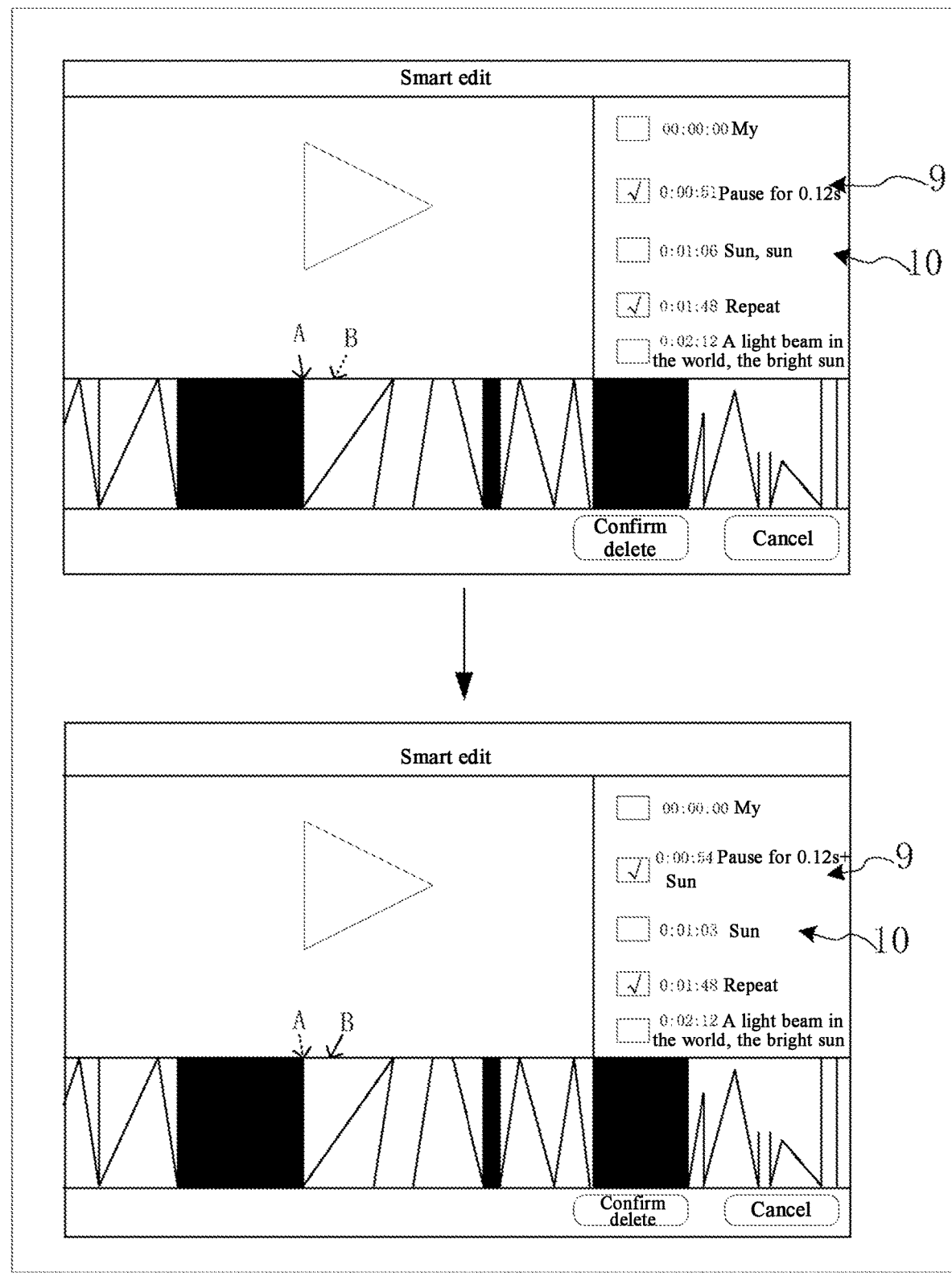
FIG. 6 is a schematic view of updating target text provided by an embodiment of the present disclosure.

FIG. 6 is a schematic view of updating target text provided by an embodiment of the present disclosure. As depicted, when an end position of a first timeline interval corresponding to first text 9 is dragged to the right from a position A to a position B, the length of the first timeline interval of the first text 9 may be extended on the editing track segment of the target video, while text content (e.g., "sun") in second text 10 corresponding to the extended portion of the first timeline interval is moved to the first text 9.

In one embodiment, the first adjustment operation comprises a length shortening operation, and updating the target text presented in the text area comprises: moving text content in the first text corresponding to a shortened portion of the first timeline interval to the second text; or adding a second text in the text area, and moving text content in the first text corresponding to a shortened portion of the first timeline interval to the second text.

The length shortening operation may be regarded as an operation of shortening the length of the first timeline interval, e.g., the length shortening operation may be an operation of dragging the start position of the first timeline interval to the right or dragging the end position of the first timeline interval to the left.

In one implementation, when the length of the first timeline interval is shortened on the editing track segment, the update mode of the target text presented in the text area may be determined depending on the different content of the first text. As an example, when the first text content is pauses, the text content in the first text corresponding to the shortened portion of the first timeline interval may be moved to the second text; while when the first text content is duplicated text, ineffective words or normal text except pauses, repetitions and ineffective words, second text may be added in the text area, and the text content in the first text corresponding to the shortened portion of the first timeline interval may be moved to the newly added second text.

Figure 7:
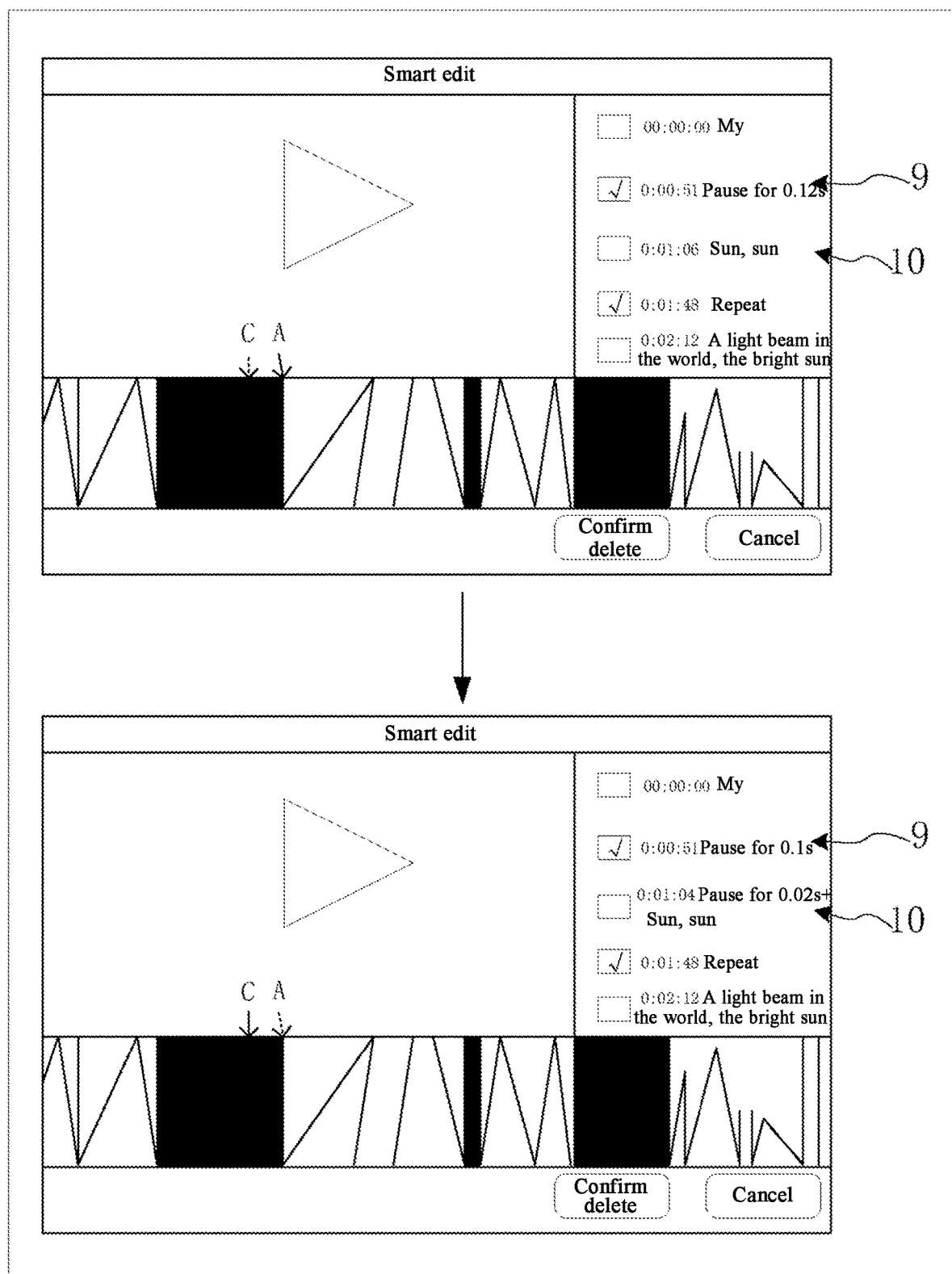
FIG. 7 is a further schematic view of updating target text provided by an embodiment of the present disclosure.

FIG. 7 is a further schematic view of updating target text provided by an embodiment of the present disclosure. As depicted, when an end position of a first timeline interval corresponding to first text 9 is dragged to the left from a position A to a position C, the length of the first timeline interval of the first text 9 may be shortened on the editing track segment of the target video, while text content (e.g., "pause for 0.02 s") in the first text 9 corresponding to the shortened portion of the first timeline interval is moved to second text 10.

Figure 8:
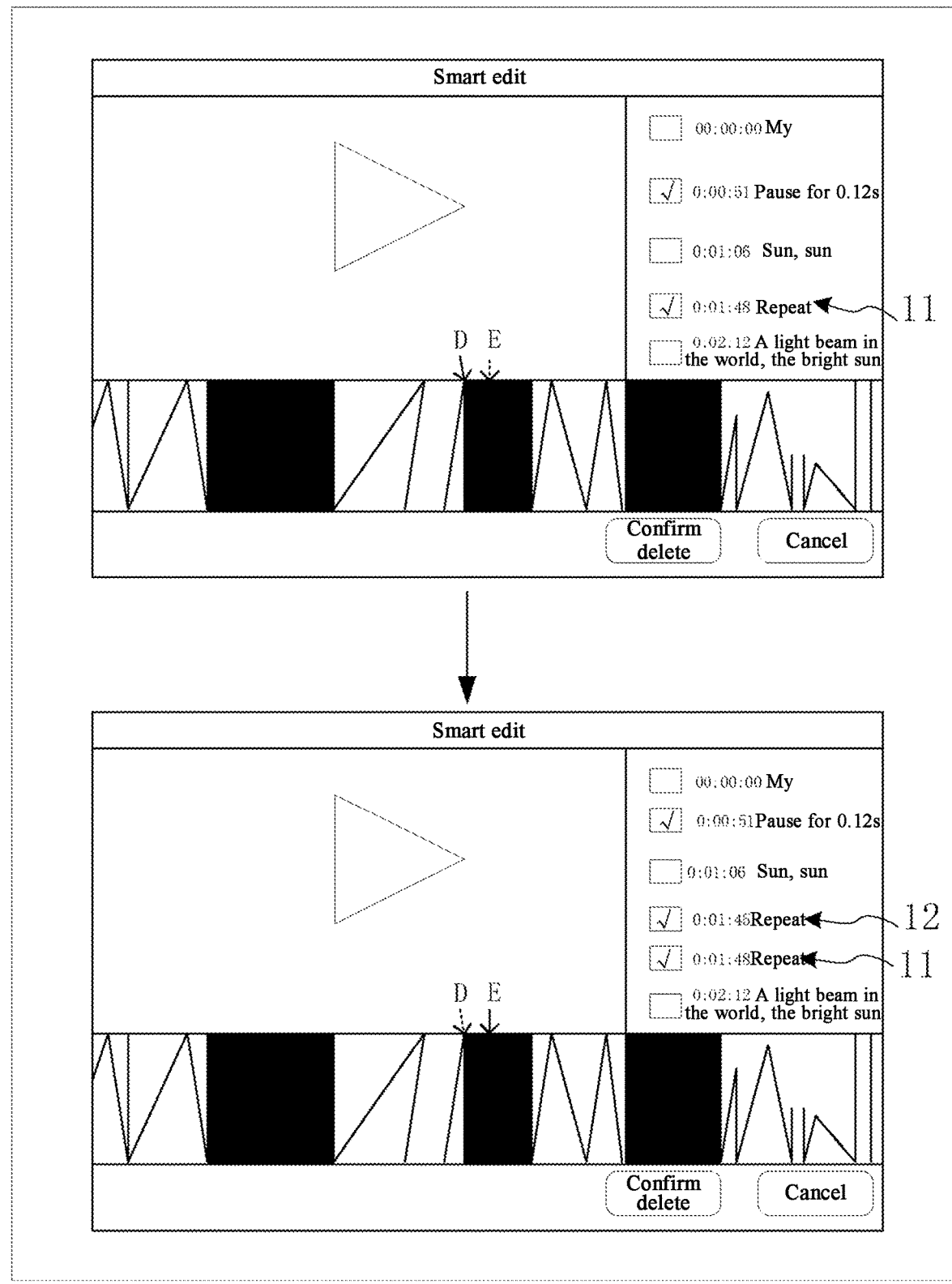
FIG. 8 is a further schematic view of updating target text provided by an embodiment of the present disclosure.

FIG. 8 is a further schematic view of updating target text provided by an embodiment of the present disclosure. As depicted, when an end position of a first timeline interval corresponding to first text 11 is dragged to the right from a position D to a position E, the length of the first timeline interval of the first text 11 may be shortened on the editing track segment of the target video, while a second text 12 may be added in the text area, and text content (e.g., "repetitions") in the first text 11 corresponding to the shortened portion of the first timeline interval is moved to the second text 12.

In one embodiment, the ineffective text is a text in a selected state in the track area, and in response to a second adjustment operation on the ineffective text, adjusting the number of timeline intervals identified on the editing track segment of the target video comprises at least one of: in response to a selection operation on a third text in the text area, switching the third text from the non-selected state to the selected state, and adding a timeline interval identifying the third text on the editing track segment; and in response to a deselection operation on a fourth text in the text area, switching the fourth text from the selected state to the non-selected state, and removing a timeline interval identifying the fourth text from the editing track segment.

The third text may be any text in the text area, such as a certain text in a non-selected state in the text area. The selection operation may refer to an operation of switching a text from a non-selected state to a selected state. For example, the selection operation may be an operation of clicking on a certain control, and this control may have a first display style and a second display style. The selected state of text may change with the display style of the control. It is not intended to limit the specific content of the first display style and the second display style, so long as different display styles can be differentiated.

The fourth text may be any text in the text area, such as a certain text in a selected state in the text area. The fourth text may be either same as or different from the third text. The deselection operation may refer to an operation of switching the text from a selected state to a non-selected state. For example, the deselection operation may be an operation of clicking on a certain control, corresponding to the selection operation.

Specifically, this embodiment may, in response to the selection operation on the third text in the text area, switch the third text from a non-selected state to a selected state, and add the timeline interval that identifies the third text on the editing track segment. On this basis, the user may add the third text to be deleted and the timeline interval of the third text according to needs.

This embodiment may also, in response to the deselection operation on the fourth text in the text area, switch the fourth text from a selected state to a non-selected state, and cancel the timeline interval that identifies the fourth text on the editing track segment. On this basis, the user may cancel the fourth text to be deleted and the timeline interval of the fourth text according to needs.

As an example, when a certain control is clicked on so that the control is displayed as the first display style, it may be considered that a selection operation on the third text corresponding to the control is triggered. At this point, the third state may be switched from a non-selected state to a selected state, and the timeline interval identifying the third text may be added on the editing track segment. When a certain control is clicked on so that the control is displayed as the second display style, it may be considered that a deselection operation on the fourth text corresponding to the control is triggered. At this point, the fourth text may be switched from a selected state to a non-selected state, and the timeline interval identifying the fourth text may be canceled from the editing track segment.

Figure 9:
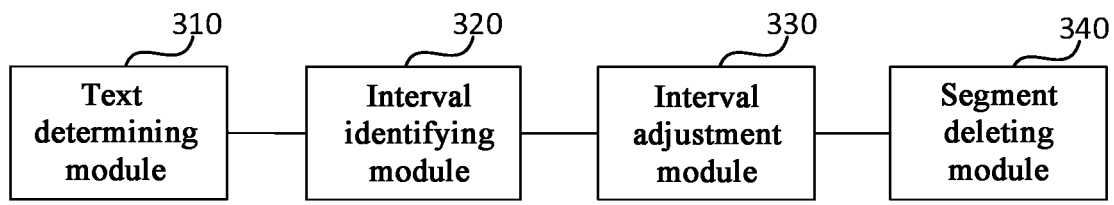
FIG. 9 is a structural block diagram of an apparatus of video editing provided by an embodiment of the present disclosure.

FIG. 9 is a structural block diagram of an apparatus of video editing provided by an embodiment of the present disclosure, which may be applicable to video editing. The apparatus may be implemented as software and/or hardware, may be generally integrated in an electronic device.

As shown in FIG. 9, the apparatus comprises: a text determining module 310, an interval identifying module 320, an interval adjustment module 330, and a segment deleting module 340.

The text determining module 310 is configured to, configured to determine an ineffective text in a speech text of a target video and a timeline position of the ineffective text by performing speech recognition on an audio in the target video, the timeline position of the ineffective text presenting a time when a speech audio of the ineffective text appears in the target video.

The interval identifying module 320 is configured to present an editing track segment of the target video on an editing interface of the target video, and identify a timeline interval of the ineffective text on the editing track segment based on the timeline position of the ineffective text, the timeline interval of the ineffective text being a time interval when the speech audio of the ineffective text appears in the target video.

The interval adjustment module 330 is configured to, in response to an adjustment operation on the ineffective text, adjust the timeline interval of the ineffective text on the editing track segment of the target video.

The segment deleting module 340 is configured to, in response to a video segment deleting operation on the ineffective text, delete a video segment of the editing track segment within the timeline interval of the ineffective text from the target video.

With the apparatus of video editing provided by the embodiment of the present disclosure, the text determining module determines an ineffective text in a speech text of a target video and a timeline position of the ineffective text by performing speech recognition on an audio in the target video, the timeline position of the ineffective text representing a time when a speech audio of the ineffective text appears in the target video; the interval identifying module presents an editing track segment of the target video on an editing interface of the target video, and identifies a timeline interval of the ineffective text on the editing track segment based on the timeline position of the ineffective text, the timeline interval of the ineffective text being a time interval when the speech audio of the ineffective text appears in the target video; the interval adjustment module adjusts, in response to an adjustment operation on the ineffective text, the timeline interval of the ineffective text on the editing track segment of the target video; and the segment deleting module deletes, in response to a video segment deleting operation on the ineffective text, a video segment of the editing track segment within the timeline interval of the ineffective text from the target video. With the apparatus, by performing speech recognition on the audio in the target video, the ineffective text in the target video and the position of the ineffective text can be determined; further, by identifying the timeline interval of the ineffective text on the editing track segment of the target video, the ineffective segment can be deleted in response to the adjustment operation and video segment deleting operation on the ineffective text from the user, thereby completing the video editing and improving the efficiency of video editing.

Optionally, the interval adjustment module 330 specifically comprises at least one of: a first response unit, and a second response unit.

The first response unit is configured to, in response to a first adjustment operation on the ineffective text, adjusting a length of the timeline interval of the ineffective text on the editing track segment of the target video.

The second response unit is configured to, in response to a second adjustment operation on the ineffective text, adjusting a number of timeline intervals identified on the editing track segment of the target video.

Optionally, the interval identifying module 320 is specifically configured to present the editing track segment of the target video in a track area of the editing interface and present an ineffective text and a non-ineffective text in the speech text in a text area of the editing interface, where the ineffective text is presented as a selected state in the editing interface, and the non-ineffective text is presented as a non-selected state in the editing interface.

Optionally, the first response unit comprises an adjustment sub-unit, configured to adjust a length of a first timeline interval of a first text on the editing track segment of the target video and update a target text presented in the text area, the target text comprising the first text and/or a second text associated with the first text.

Optionally, the first adjustment operation comprises a length extending operation, and the adjustment sub-unit is specifically configured to move text content in the second text corresponding to an extended portion of the first timeline interval to the first text.

Optionally, the first adjustment operation comprises a length shortening operation, and the adjustment sub-unit is specifically configured to: move text content in the first text corresponding to a shortened portion of the first timeline interval to the second text; or add a second text in the text area, and move text content in the first text corresponding to a shortened portion of the first timeline interval to the second text.

Optionally, the ineffective text is text in a selected text in the track area, and the second response unit is specifically configured to at least one of: in response to a selection operation on a third text in the text area, switching the third text from the non-selected state to the selected state, and adding a timeline interval identifying the third text on the editing track segment; and in response to a deselection operation on a fourth text in the text area, switching the fourth text from the selected state to the non-selected state, and removing a timeline interval identifying the fourth text from the editing track segment.

Optionally, the apparatus of video editing provided by the embodiment of the present disclosure further comprises a playing module and a first progress adjustment module.

The playing module is configured to play the target video in a video area of the editing interface.

The first progress adjustment module is configured to, in response to playing the target video to a start position of a second timeline interval, adjust a playing progress of the target video to a first time point and continue to play the target video from the first time point, where the second timeline interval is a timeline interval of the ineffective text, and the first time point is a time point in the target video corresponding to an end position of the second timeline interval.

Optionally, the apparatus of video editing provided by the embodiment of the present disclosure further comprises a first response module.

The first response module is configured to, after playing the target video in the video area of the editing interface, in response to a triggering operation on a fifth text, adjust the playing progress of the target video to a second time point and continue to play the target video from the second time point, the fifth text being displayed within a text area of the editing interface, the fifth text being an ineffective text or a non-ineffective text, and the second time point being a time point in the target video corresponding to a start position of the fifth text.

Optionally, a time identification is further presented on the editing track segment, and the apparatus of video editing provided by the embodiment of the present disclosure further comprises a second response module, a second progress adjustment module, and a third progress adjustment module.

The second response module is configured to, after playing the target video in the video area of the editing interface, in response to a position adjustment operation on the target identification, determine a third timeline interval where a target position of the target identification is located, the target position being a position of the target identification on the editing track segment upon completion of the position adjustment operation.

The second progress adjustment module is configured to, in response to the third timeline interval being a timeline interval of the ineffective text, adjust the playing progress of the target video to a third time point and continue to play the target video from the third time point, where the third time point is a time point in the target video corresponding to a start position or an end position of the third timeline interval, or is a time point to which the target video is finally played before the position progress adjustment operation is received.

The third progress adjustment module is configured to, in response to the third timeline interval being not a timeline interval of the ineffective text, adjust the playing progress of the target video to a fourth time point and continue to play the target video from the fourth time point, where the fourth time point is a time point in the target video corresponding to the target position.

Optionally, the segment deleting module 340 is specifically configured to: delete the video segment of the editing track segment within the timeline interval of the ineffective text from the target video, and split the target video into a plurality of separate video segments by using the deleted video segment as a split point; or delete the video segment of the editing track segment within the timeline interval of the ineffective text from the target video, and integrate the target video after the video segment has been deleted into a single video.

Optionally, the editing track segment is an audio track segment of the target video.

The apparatus of video editing may perform the method of video editing provided by any embodiment of the present disclosure, with the corresponding functional modules and advantageous effects of performing the method.

Figure 10:
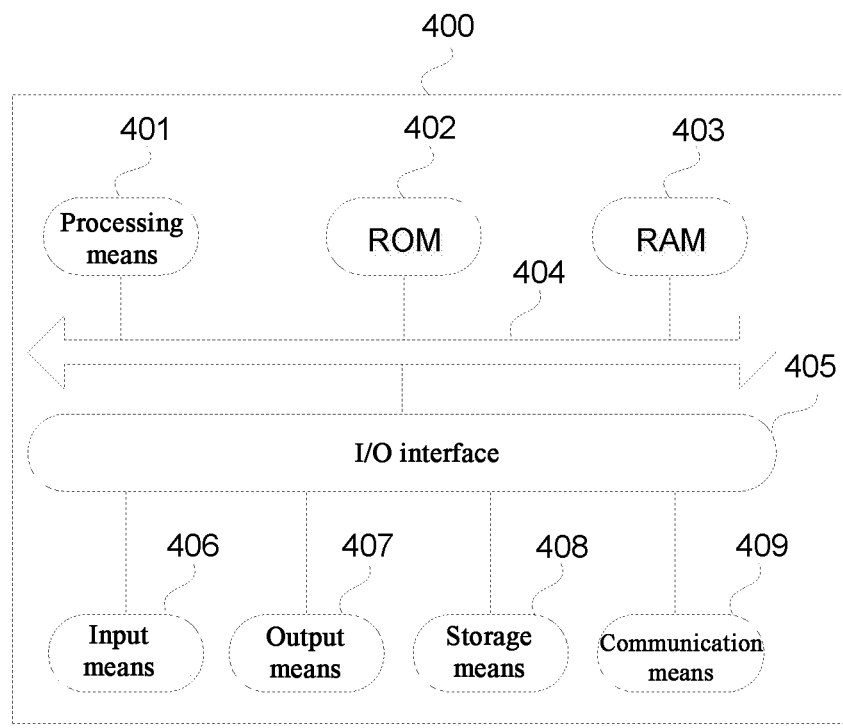
FIG. 10 is a structural block diagram of an electronic device provided by an embodiment of the present disclosure.

With reference to FIG. 10 below, the figure shows a schematic block diagram of an electronic device 400 suitable for implementing embodiments of the present disclosure. The electronic device in the embodiments of the present disclosure may include, without limitation to, a mobile terminal such as a mobile phone, a notebook computer, a digital broadcast receiver, PDA (personal digital assistant), PDA (tablet computer), PMP (portable multimedia player) and a vehicle terminal (e.g., a vehicle navigation terminal), and a fixed terminal such as a digital TV and a desktop computer. The electronic device shown in FIG. 10 is merely an example and not intended to limit the functionality and application scope of the embodiments of the present disclosure.

As shown in FIG. 10, the electronic device 400 may comprise processing means (e.g., a central processor, a graphics processor, etc.) 401 which is capable of performing various appropriate actions and processes in accordance with a program stored in a read only memory (ROM) 402 or a program loaded from storage means 408 to a random access memory (RAM) 403. In the RAM 403, there are also stored various programs and data required by the electronic device 400 when operating. The processing means 401, the ROM 402 and the RAM 403 are connected to one another via a bus 404. An input/output (I/O) interface 405 is also connected to the bus 404.

Usually, the following means are connected to the I/O interface 405: input means 406 including a touch screen, a touch tablet, a keyboard, a mouse, a camera, a microphone, an accelerometer, a gyroscope or the like; output means 407 including a liquid crystal display, a loudspeaker a vibrator or the like; storage means 408, including a magnetic tape, a hard disk or the like; and communication means 409. The communication means 409 allows the electronic device 400 to exchange information/data with other device in a wireless or wired way. Although FIG. 10 shows the electronic device 400 with various means, it should be understood that it does not require to implement or have all the shown means. Alternatively, more or less means may be implemented or comprised.

In particular, the procedures described with reference to the flowchart according to the embodiments of the present disclosure may be implemented as a computer software program. For example, the embodiments of the present disclosure comprise a computer program product, which comprises a computer program carried on a non-transient computer readable medium, the computer program containing program code for performing the method shown in the flowchart. In such an embodiment, the computer program may be downloaded from the network and installed via the communication means 409, or installed from the storage means 408, or installed from the ROM 402. The computer program, when executed by the processing means 401, may execute the above functions defined in the method according to the embodiments of the present disclosure.

It is noteworthy that the computer readable medium can be a computer readable signal medium or a computer readable storage medium or any combination thereof. The computer readable storage medium may be, for example, but is not limited to, an electronic, magnetic, optical, electromagnetic, infrared, semiconductor system, means or device, or any suitable combination of the foregoing. More specific examples of the computer readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the client and the server may communicate using any network protocol that is currently known or to be developed in future, such as HTTP (HyperText Transfer Protocol) and the like, and may be interconnected with any form or medium of digital data communication (e.g., communication networks). Examples of communication networks include: a local-area network ("LAN"), a wide-area network ("WAN"), an internet network (e.g., the Internet), a peer-to-peer network (e.g., ad hoc peer-to-peer network), and any network that is currently known or to be developed in future.

The above computer readable medium may be included in the above-mentioned electronic device; and it may also exist alone without being assembled into the electronic device.

The computer readable medium carries one or more programs which, when executed by the electronic device, cause the electronic device to: determine an ineffective text in a speech text of a target video and a timeline position of the ineffective text by performing speech recognition on an audio in the target video, the timeline position of the ineffective text representing a time when a speech audio of the ineffective text appears in the target video; present an editing track segment of the target video on an editing interface of the target video, and identify a timeline interval of the ineffective text on the editing track segment based on the timeline position of the ineffective text, the timeline interval of the ineffective text being a time interval when the speech audio of the ineffective text appears in the target video; in response to an adjustment operation on the ineffective text, adjust the timeline interval of the ineffective text on the editing track segment of the target video; and in response to a video segment deleting operation on the ineffective text, delete a video segment of the editing track segment within the timeline interval of the ineffective text from the target video.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the module per se.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

According to one or more embodiments of the present disclosure, Example 1 provides a method of video editing, comprising:

determining an ineffective text in a speech text of a target video and a timeline position of the ineffective text by performing speech recognition on an audio in the target video, the timeline position of the ineffective text representing a time when a speech audio of the ineffective text appears in the target video;

presenting an editing track segment of the target video on an editing interface of the target video, and identifying a timeline interval of the ineffective text on the editing track segment based on the timeline position of the ineffective text, the timeline interval of the ineffective text being a time interval when the speech audio of the ineffective text appears in the target video;

in response to an adjustment operation on the ineffective text, adjusting the timeline interval of the ineffective text on the editing track segment of the target video; and in response to a video segment deleting operation on the ineffective text, deleting a video segment of the editing track segment within the timeline interval of the ineffective text from the target video.

According to one or more embodiments of the present disclosure, in Example 2 of the method as described in Example 1, in response to an adjustment operation on the ineffective text, adjusting the timeline interval of the ineffective text on the editing track segment of the target video comprises at least one of:

in response to a first adjustment operation on the ineffective text, adjusting a length of the timeline interval of the ineffective text on the editing track segment of the target video;

in response to a second adjustment operation on the ineffective text, adjusting a number of timeline intervals identified on the editing track segment of the target video.

According to one or more embodiments of the present disclosure, in Example 3 of the method as described in Example 2, presenting the editing track segment of the target video on the editing interface of the target video comprises:

presenting the editing track segment of the target video in a track area of the editing interface and presenting an ineffective text and a non-ineffective text in the speech text in a text area of the editing interface, wherein the ineffective text is presented as a selected state in the editing interface, and the non-ineffective text is presented as a non-selected state in the editing interface.

According to one or more embodiments of the present disclosure, in Example 4 of the method as described in Example 3, adjusting the length of the timeline interval of the ineffective text on the editing track segment of the target video comprises:

adjusting a length of a first timeline interval of a first text on the editing track segment of the target video and updating a target text presented in the text area, the target text comprising the first text and/or a second text associated with the first text.

According to one or more embodiments of the present disclosure, in Example 5 of the method as described in Example 4, the first adjustment operation comprises a length extending operation, and updating target text presented in the text area comprises:

moving text content in the second text corresponding to an extended portion of the first timeline interval to the first text.

According to one or more embodiments of the present disclosure, in Example 6 of the method as described in Example 4, the first adjustment operation comprises a length shortening operation, and updating the target text presented in the text area comprises:

moving text content in the first text corresponding to a shortened portion of the first timeline interval to the second text; or adding a second text in the text area, and moving text content in the first text corresponding to a shortened portion of the first timeline interval to the second text.

According to one or more embodiments of the present disclosure, in Example 7 of the method as described in Example 3, the ineffective text is a text in the selected state in the track area, and in response to the second adjustment operation on the ineffective text, adjusting the number of timeline intervals identified on the editing track segment of the target video comprises at least one of:

in response to a selection operation on a third text in the text area, switching the third text from the non-selected state to the selected state, and adding a timeline interval identifying the third text on the editing track segment;

in response to a deselection operation on a fourth text in the text area, switching the fourth text from the selected state to the non-selected state, and removing a timeline interval identifying the fourth text from the editing track segment.

According to one or more embodiments of the present disclosure, in Example 8 of the method as described in any of Examples 1 to 7, the method further comprises:

playing the target video in a video area of the editing interface; and in response to playing the target video to a start position of a second timeline interval, adjusting a playing progress of the target video to a first time point and continuing to play the target video from the first time point, wherein the second timeline interval is a timeline interval of the ineffective text, and the first time point is a time point in the target video corresponding to an end position of the second timeline interval.

According to one or more embodiments of the present disclosure, in Example 9 of the method as described in Example 8, the method further comprises: after playing the target video in the video area of the editing interface, in response to a triggering operation on a fifth text, adjusting the playing progress of the target video to a second time point and continuing to play the target video from the second time point, the fifth text being displayed within a text area of the editing interface, the fifth text being an ineffective text or a non-ineffective text, and the second time point being a time point in the target video corresponding to a start position of the fifth text.

According to one or more embodiments of the present disclosure, in Example 10 of the method as described in Example 8, wherein a time identification is further presented on the editing track segment, and the method further comprises: after playing the target video in the video area of the editing interface, in response to a position adjustment operation on the target identification, determining a third timeline interval where a target position of the target identification is located, the target position being a position of the target identification on the editing track segment upon completion of the position adjustment operation;

in response to the third timeline interval being a timeline interval of the ineffective text, adjusting the playing progress of the target video to a third time point and continuing to play the target video from the third time point, wherein the third time point is a time point in the target video corresponding to a start position or an end position of the third timeline interval, or is a time point to which the target video is finally played before the position progress adjustment operation is received; and in response to the third timeline interval being not a timeline interval of the ineffective text, adjusting the playing progress of the target video to a fourth time point and continuing to play the target video from the fourth time point, wherein the fourth time point is a time point in the target video corresponding to the target position.

According to one or more embodiments of the present disclosure, in Example 11 of the method as described in any of Examples 1 to 7, deleting the video segment of the editing track segment within the timeline interval of the ineffective text from the target video comprises:

deleting the video segment of the editing track segment within the timeline interval of the ineffective text from the target video, and splitting the target video into a plurality of separate video segments by using the deleted video segment as a split point; or deleting the video segment of the editing track segment within the timeline interval of the ineffective text from the target video, and integrating the target video after the video segment has been deleted into a single video.

According to one or more embodiments of the present disclosure, in Example 12 of the method as described in any of Examples 1 to 7, the editing track segment is an audio track segment of the target video.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

We claim:

1. A method of video editing, comprising:

determining an ineffective text in a speech text of a target video and a timeline position of the ineffective text by performing speech recognition on an audio in the target video, the timeline position of the ineffective text representing a time when a speech audio of the ineffective text appears in the target video;

presenting an editing track segment of the target video on an editing interface of the target video, and identifying a timeline interval of the ineffective text on the editing track segment based on the timeline position of the ineffective text, the timeline interval of the ineffective text being a time interval when the speech audio of the ineffective text appears in the target video;

in response to an adjustment operation on the ineffective text, adjusting the timeline interval of the ineffective text on the editing track segment of the target video; and in response to a video segment deleting operation on the ineffective text, deleting a video segment of the editing track segment within the timeline interval of the ineffective text from the target video.

2. The method according to claim 1, wherein in response to an adjustment operation on the ineffective text, adjusting the timeline interval of the ineffective text on the editing track segment of the target video comprises at least one of:

in response to a first adjustment operation on the ineffective text, adjusting a length of the timeline interval of the ineffective text on the editing track segment of the target video;

in response to a second adjustment operation on the ineffective text, adjusting a number of timeline intervals identified on the editing track segment of the target video.

3. The method according to claim 2, wherein presenting the editing track segment of the target video on the editing interface of the target video comprises:

presenting the editing track segment of the target video in a track area of the editing interface and presenting an ineffective text and a non-ineffective text in the speech text in a text area of the editing interface, wherein the ineffective text is presented as a selected state in the editing interface, and the non-ineffective text is presented as a non-selected state in the editing interface.

4. The method according to claim 3, wherein adjusting the length of the timeline interval of the ineffective text on the editing track segment of the target video comprises:

adjusting a length of a first timeline interval of a first text on the editing track segment of the target video and updating a target text presented in the text area, the target text comprising the first text and/or a second text associated with the first text.

5. The method according to claim 4, wherein the first adjustment operation comprises a length extending operation, and updating target text presented in the text area comprises:

moving text content in the second text corresponding to an extended portion of the first timeline interval to the first text.

6. The method according to claim 4, wherein the first adjustment operation comprises a length shortening operation, and updating the target text presented in the text area comprises:

moving text content in the first text corresponding to a shortened portion of the first timeline interval to the second text; or adding a second text in the text area, and moving text content in the first text corresponding to a shortened portion of the first timeline interval to the second text.

7. The method according to claim 3, wherein the ineffective text is a text in the selected state in the track area, and in response to the second adjustment operation on the ineffective text, adjusting the number of timeline intervals identified on the editing track segment of the target video comprises at least one of:

in response to a selection operation on a third text in the text area, switching the third text from the non-selected state to the selected state, and adding a timeline interval identifying the third text on the editing track segment;

in response to a deselection operation on a fourth text in the text area, switching the fourth text from the selected state to the non-selected state, and removing a timeline interval identifying the fourth text from the editing track segment.

8. The method according to claim 1, further comprising:

playing the target video in a video area of the editing interface; and in response to playing the target video to a start position of a second timeline interval, adjusting a playing progress of the target video to a first time point and continuing to play the target video from the first time point, wherein the second timeline interval is a timeline interval of the ineffective text, and the first time point is a time point in the target video corresponding to an end position of the second timeline interval.

9. The method according to claim 8, wherein the method further comprises: after playing the target video in the video area of the editing interface, in response to a triggering operation on a fifth text, adjusting the playing progress of the target video to a second time point and continuing to play the target video from the second time point, the fifth text being displayed within a text area of the editing interface, the fifth text being an ineffective text or a non-ineffective text, and the second time point being a time point in the target video corresponding to a start position of the fifth text.

10. The method according to claim 8, wherein a time identification is further presented on the editing track segment, and the method further comprises: after playing the target video in the video area of the editing interface, in response to a position adjustment operation on the target identification, determining a third timeline interval where a target position of the target identification is located, the target position being a position of the target identification on the editing track segment upon completion of the position adjustment operation;

in response to the third timeline interval being a timeline interval of the ineffective text, adjusting the playing progress of the target video to a third time point and continuing to play the target video from the third time point, wherein the third time point is a time point in the target video corresponding to a start position or an end position of the third timeline interval, or is a time point to which the target video is finally played before the position progress adjustment operation is received; and in response to the third timeline interval being not a timeline interval of the ineffective text, adjusting the playing progress of the target video to a fourth time point and continuing to play the target video from the fourth time point, wherein the fourth time point is a time point in the target video corresponding to the target position.

11. The method according to claim 1, wherein deleting the video segment of the editing track segment within the timeline interval of the ineffective text from the target video comprises:

deleting the video segment of the editing track segment within the timeline interval of the ineffective text from the target video, and splitting the target video into a plurality of separate video segments by using the deleted video segment as a split point; or deleting the video segment of the editing track segment within the timeline interval of the ineffective text from the target video, and integrating the target video after the video segment has been deleted into a single video.

12. The method according to claim 1, wherein the editing track segment is an audio track segment of the target video.

13. An electronic device, comprising:

at least one processor; and a memory, communicatively connected with the at least one processor; wherein the memory stores a computer program executable by the at least one processor, the computer program, when executed by the at least one processor, causes the at least one processor to:

determine an ineffective text in a speech text of a target video and a timeline position of the ineffective text by performing speech recognition on an audio in the target video, the timeline position of the ineffective text representing a time when a speech audio of the ineffective text appears in the target video;

present an editing track segment of the target video on an editing interface of the target video, and identify a timeline interval of the ineffective text on the editing track segment based on the timeline position of the ineffective text, the timeline interval of the ineffective text being a time interval when the speech audio of the ineffective text appears in the target video;

in response to an adjustment operation on the ineffective text, adjust the timeline interval of the ineffective text on the editing track segment of the target video; and in response to a video segment deleting operation on the ineffective text, delete a video segment of the editing track segment within the timeline interval of the ineffective text from the target video.

14. The electronic device according to claim 13, wherein the at least processor is caused to, in response to an adjustment operation on the ineffective text, adjust the timeline interval of the ineffective text on the editing track segment of the target video by being caused to at least one of:

in response to a first adjustment operation on the ineffective text, adjust a length of the timeline interval of the ineffective text on the editing track segment of the target video;

in response to a second adjustment operation on the ineffective text, adjust a number of timeline intervals identified on the editing track segment of the target video.

15. The electronic device according to claim 14, wherein the at least one processor is caused to present the editing track segment of the target video on the editing interface of the target video by being caused to:

present the editing track segment of the target video in a track area of the editing interface and present an ineffective text and a non-ineffective text in the speech text in a text area of the editing interface, wherein the ineffective text is presented as a selected state in the editing interface, and the non-ineffective text is presented as a non-selected state in the editing interface.

16. The electronic device according to claim 15, wherein the at least one processor is caused to adjust the length of the timeline interval of the ineffective text on the editing track segment of the target video by being caused to:

adjust a length of a first timeline interval of a first text on the editing track segment of the target video and update a target text presented in the text area, the target text comprising the first text and/or a second text associated with the first text.

17. The electronic device according to claim 16, wherein the first adjustment operation comprises a length extending operation, and the at least one processor is caused to update target text presented in the text area by being caused to:
move text content in the second text corresponding to an extended portion of the first timeline interval to the first text.

18. The electronic device according to claim 16, wherein the first adjustment operation comprises a length shortening operation, and the at least one processor is caused to update the target text presented in the text area by being caused to:
move text content in the first text corresponding to a shortened portion of the first timeline interval to the second text; or
add a second text in the text area, and move text content in the first text corresponding to a shortened portion of the first timeline interval to the second text.

19. The method according to claim 15, wherein the ineffective text is a text in the selected state in the track area, and the at least one processor is caused to, in response to the second adjustment operation on the ineffective text, adjust the number of timeline intervals identified on the editing track segment of the target video by being caused to:
in response to a selection operation on a third text in the text area, switch the third text from the non-selected state to the selected state, and add a timeline interval identifying the third text on the editing track segment;
in response to a deselection operation on a fourth text in the text area, switch the fourth text from the selected state to the non-selected state, and remove a timeline interval identifying the fourth text from the editing track segment.

20. A non-transitory computer readable storage medium, storing computer instructions thereon, the computer instructions causing a processor to: determine an ineffective text in a speech text of a target video and a timeline position of the ineffective text by performing speech recognition on an audio in the target video, the timeline position of the ineffective text representing a time when a speech audio of the ineffective text appears in the target video; present an editing track segment of the target video on an editing interface of the target video, and identify a timeline interval of the ineffective text on the editing track segment based on the timeline position of the ineffective text, the timeline interval of the ineffective text being a time interval when the speech audio of the ineffective text appears in the target video; in response to an adjustment operation on the ineffective text, adjust the timeline interval of the ineffective text on the editing track segment of the target video; and in response to a video segment deleting operation on the ineffective text, delete a video segment of the editing track segment within the timeline interval of the ineffective text from the target video.

* * * * *